UNITED STATES PATENT OFFICE 2,640,186

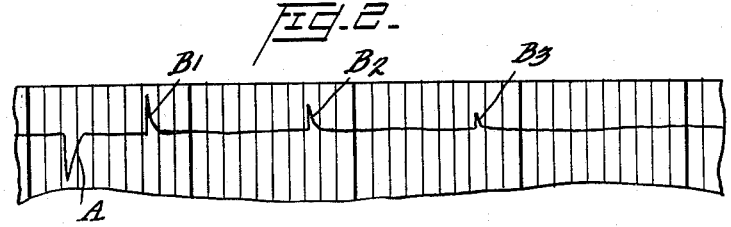

SEISMIC SURVEYING

Arthur F. Hasbrook, San Antonio, Tex., assignor to Olive S. Petty, San Antonio, Tex.

Application June 13, 1949, Serial No. 98,783

5 Claims. (Cl. 340—16)

This invention relates to methods and apparatus for use in seismic surveying, and more especially to improvements in the practice of recording time-break signals, by means of which the instant of detonation of the explosive charge may be recorded and invariably determined with accuracy at a station remote from the blast.

In the field of seismic surveying, it is the customary practice to generate seismic waves in the earth by firing a charge of high explosive, such as dynamite or blasting gelatin, either adjacent to or beneath the surface. The seismic waves so created are reflected upwardly from various discontinuities beneath the surface and are received at a plurality of stations some distance from the source of the shock. At each receiving point, the seismic waves are received by an instrument, sometimes called a seismometer, and converted into electrical waveform energy, which is amplified and recorded; a plurality of traces, each representing the seismic energy received at one of the several seismometers, is commonly recorded on a single chart or seismogram. In order to interpret these traces, and especially to determine the various depths from which the seismic energy has been reflected, it is essential that the exact time of firing the explosive charge be noted on the same seismogram.

In the practice most commonly followed, the instant of firing the charge, or the time-break, is represented by a single pulse on the record, often transmitted from the shot-point to the recording station by ratio, and is occasionally obscured by interfering signals or stray energy. When this occurs, the seismic record is difficult to interpret and may even be rendered worthless. The obscuring of the time break is, of course, especially common and costly in exploration of the long distance refraction type, in which radio transmission is essential. Various attempts, partly successful, have been made in the past to obviate these difficulties and to insure identification and exact location of the time-break signal, these including the use of mechanical switching units designed to give a succession of signals, whereby the instant of firing may be computed when the original time-break pulse is obscured. One of the difficulties encountered in the use of such devices is the inevitable lack of timing accuracy in the generation of a series of signals by mechanical means.

It is, therefore, an object of the invention to overcome these and other defects in the practice of recording time-break signals by generating in electronic circuits a series of accurately spaced pulses, each bearing a definite relation in time to the original time-break pulse, the original pulse and the separately generated series of pulses being combined, preferably in opposite polarity to avoid confusion, and suitably transmitted and recorded.

In the preferred form of the invention, the time-break pulse, which may be derived in any convenient manner from the firing circuit or the blast, is applied to energize a damped wave generator, by which a series of waves of decaying amplitude is produced. This series of waves is then passed through a pulse shaper, and the resulting pulses are so combined with the original pulse that the latter may be distinguished by its polarity.

As a further feature of the invention, transmission to the recording station of the time-break signals so produced may be effected by applying the series of pulses to a carrier wave, generation or radiation of the carrier being initiated by the original time-break pulse, while the following series of pulses is applied as modulation on the carrier. Thus the instant of arrival of the carrier wave at the remote recording station denotes the true time break, whereas the succeeding series of pulses affords an accurate record from which the correct position of the time break may be computed in the event the instant of arrival of the carrier is obscured.

Further objects and features of the invention will be apparent from the following description taken in connection with the accompanying drawings, in which Figure 1 represents diagrammatically a seismic system suitable for the practice of the invention, illustrating a preferred form of damped wave generator and pulse shaper;

Figure 2 represents part of a seismogram on which appears a time-break trace such as may be produced by apparatus of the type shown in Figure 1; and Figure 3 is a wiring diagram of a preferred form of transmitting circuit for use in the practice of the invention.

In order to promote an understanding of the invention, reference is made to the specific embodiment thereof illustrated in the accompanying drawings and the same is described in detail hereinafter. It will nevertheless be understood that such modifications and alterations of the invention are contemplated as would normally occur to those skilled in the art to which the invention relates.

In Figure 1 is represented diagrammatically a system for the generation, transmission, and recording of time-break signals, components of the system which may be conventional being shown as a block diagram and bearing appropriate legends. Thus the source of the usual time-break pulse is represented at 10. This pulse is applied to wave generating and pulse shaping circuits illustrated in detail, wherein a series of distinctive pulses is combined with the original time-break pulse, preferably in such manner as to be readily distinguished from the latter, for instance by combination in opposite polarity. The time-break signals thus produced are supplied to a radio transmitter 20, by which they are radiated to a receiver 21, located at the remote recording station, and supplied to a conventional seismic recorder 22.

Dealing more particularly with the wave generating and pulse shaping circuits, it will be noted that the initial time-break pulse from source 10, which may be derived from the firing circuit as shown in the patents to Parr, Jr. 2,331,623, Petty 2,331,627, or in any other appropriate manner, is applied through condenser 12 and across resistor 14 to the grid of electron tube 13. The cathode of the tube is appropriately biased by resistors 17 and 18 and the tube output is fed to a transformer 15, the primary winding of which is shunted by condenser 16, the characteristics of the circuit being so chosen that it functions as a damped wave generator.

Thus in the quiescent state, plate current in tube 13 is blocked by the positive voltage impressed on the cathode through resistor network 17, 18. When the positive impulse constituting the original time-break pulse is applied to the grid of the tube, plate current surges through the tuned circuit comprising transformer 15 and condenser 16, the initial voltage surge at the plate being negative because of the large drop in potential across the reactive tuned circuit. Oscillation of frequency, determined primarily by the values of the primary winding of transformer 15 and of condenser 16, then occurs, but is damped by the various circuit losses. Thus the output at the plate of tube 13 is approximately a sine wave, rapidly decaying to zero amplitude, preferably after a few cycles.

The damped wave output is supplied from transformer 15 to the grid of electron tube 19, which is normally held at plate current cutoff by the bias voltage provided by resistors 26 and 27. Thus tube 19 responds only to the positive swings of the applied damped wave, and the output, consisting of predominantly negative signals is applied to a differentiating circuit comprising condenser 23 and resistor 24, so that the resulting signals appear in the form of a series of highly peaked negative pulses of decreasing amplitude. These signals are then applied to a grid of a multi-grid amplifier 25, the original time-break pulse being applied to a second grid of the amplifier through condenser 28. In this manner the original time-break pulse and the succeeding series of generated pulses are combined in opposite polarity, as shown, and supplied to radio transmitter 20 for radiation, reception, and recording.

In Figure 2 is shown a part of a seismogram on which is represented a trace of the general type produced by the apparatus thus far described, the original time-beak pulse being indicated at A and the succeeding series of pulses of opposite polarity and decreasing amplitude being shown at B₁, B₂, and B₃. It will be appreciated that whenever the initial pulse A is obscured on the record, its exact location can be readily identified from the position of the pulses of the succeeding series, or such of these as have not been also obscured.

In its broadest aspects the invention contemplates the electronic generation, by other methods and means than those herein described, of a series of pulses each bearing a predetermined time relation to the original time-break pulse for recording with the latter, whereby the correct position of said time-break pulse may be determined accurately even when obscured.

In Figure 3 is represented a preferred method of transmitting signal energy, generated as hereinbefore described, for recording at a remote point. Thus the combined signal appearing in the output of tube 25 may be applied to the grid of tube 30, functioning merely to amplify the signal and reverse the polarity of the pulses. The signal thus amplified is then supplied through condenser 31 to the grid of thyratron tube 33, which is normally biased off by means of a positive voltage developed through potentiometer 34, which supplies biasing voltage to the cathode of the tube. Thyratron 33 is connected in series with tube 35, the arrangement being such that plate current flow in tube 35 is initiated when thyratron 33 is fired. Control grid 41 of tube 35 is supplied with waveform energy at the desired carrier frequency, so that the carrier is transmitted through condenser 37 and transformer 36 to the antenna at the instant of arrival at the grid of thyratron 33 of the positive pulse which represents the actual time break.

It will be appreciated that the remaining components of the circuit in which 35 is included are those common to a modulated R. F. amplifier stage, the modulating signal being supplied from tube 30 through condenser 44 to modulator 43 and through transformer 42 and choke 38 to the output of tube 35. This modulation comprises the series of negative pulses which are generated as described with reference to Figure 1 and reversed in polarity in tube 30.

By means of the circuit just described, radiation of the carrier is initiated by the original time-break pulse, so as to indicate at the recording station the exact time of firing the charge. If the arrival of the carrier at the recording station is obscured because of interference, the exact instant of detonation can be computed from the position on the record of the pulses of the following series.

Having thus described the invention, what is claimed as new and desired to be secured by Letters Patent is:

1. Apparatus for use in the recording of time-break signals in seismic surveying including, in combination, an electronic circuit responsive to the time-break pulse to generate a series of pulses having a predetermined time relation with said time-break pulse to provide a signal from which the correct position of the time-break pulse can be determined regardless of its obscurity; a transmitter radiating a carrier signal, and means modulating said carrier with said series of pulses.

2. Apparatus for use in the recording of time-break signals in seismic surveying including, in combination, an electronic circuit responsive to the time-break pulse to generate a series of pulses having a predetermined time relation with said time-break pulse to provide a signal from which the correct position of the time-break pulse can be determined regardless of its obscurity, a transmitter radiating a carrier signal, means modulating said carrier with said series of pulses, and means combining in opposite polarity said separate pulses with said time-break pulse and applying the combined signal to said last named circuit and said modulating means.

3. Apparatus for use in the recording of time-break signals in seismic surveying including, in combination, a damped wave generator responsive to the time-break pulse to generate a series of waves of decaying amplitude, a pulse shaper receiving and shaping said waves into separate pulses to provide a signal from which the correct position of the time-break pulse can be determined regardless of its obscurity, a transmitter radiating a carrier signal, and means modulating said carrier with said series of pulses.

4. Apparatus for use in the recording of time-break signals in seismic surveying including, in combination, an electronic circuit responsive to the time-break pulse to generate a series of waves having a predetermined time relation to the time-break pulse, a pulse shaper receiving and shaping said waves into separate pulses, and means combining said separate pulses with said time-break pulse to provide a signal from which the correct position of the time-break pulse can be determined regardless of its obscurity.

5. Apparatus for use in the recording of time-break signals in seismic surveying including, in combination, a damped wave generator responsive to the time-break pulse to generate a series of waves of decaying amplitude, a pulse shaper receiving and shaping said waves into separate pulses, and means combining in opposite polarity said separate pulses with said time-break pulse to provide a signal from which the correct position of the time-break pulse can be determined regardless of its obscurity.

ARTHUR F. HASBROOK.

References Cited in the file of this patent

UNITED STATES PATENTS

| Number | Name | Date |
|---|---|---|
| 2,084,845 | Holmes | June 22, 1937 |
| 2,250,834 | Howton | July 29, 1941 |
| 2,340,770 | Reichert | Feb. 1, 1944 |
| 2,348,525 | Cravath | May 9, 1944 |
| 2,435,903 | Ritzmann | Feb. 10, 1948 |
| 2,493,379 | Anderson | Jan. 3, 1950 |
| 2,494,990 | De Lano | Jan. 17, 1950 |